(No Model.)

C. J. PAULSON.
DIFFERENTIAL GEAR WHEEL.

No. 541,385. Patented June 18, 1895.

Witnesses.
W. J. Morgan
Jos. S. Lockwood

Inventor
C. J. Paulson
By A. P. Thayer
atty

UNITED STATES PATENT OFFICE.

CARL JOHAN PAULSON, OF BROOKLYN, NEW YORK, ASSIGNOR OF ONE-HALF TO SVEN LJUNGSTRANDT, OF SAME PLACE.

DIFFERENTIAL GEAR-WHEEL.

SPECIFICATION forming part of Letters Patent No. 541,385, dated June 18, 1895.

Application filed April 19, 1894. Serial No. 508,155. (No model.)

*To all whom it may concern:*

Be it known that I, CARL JOHAN PAULSON, a subject of the King of Sweden and Norway, and a resident of Brooklyn, in the county of Kings and State of New York, have invented certain new and useful Improvements in Differential Gear-Wheels, of which the following is a specification.

My invention relates to means of changing speeds of positively driven shafts as the feed screw of a turning lathe and the like, and it consists of a gear wheel having a series of spur toothed rings of different diameters, and means of substituting one for another readily and adapted to be used in connection with a spur driver capable of being shifted suitably to connect with the different rings as hereinafter described reference being made to the accompanying drawings, in which—

Figure 3:
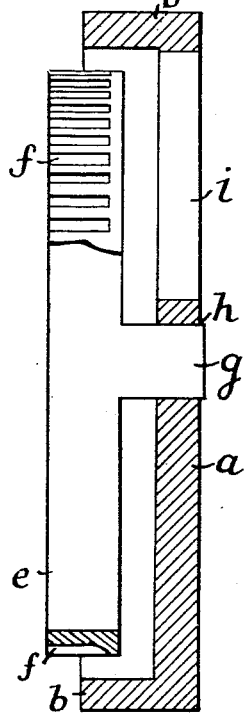
Figures 1, 2:
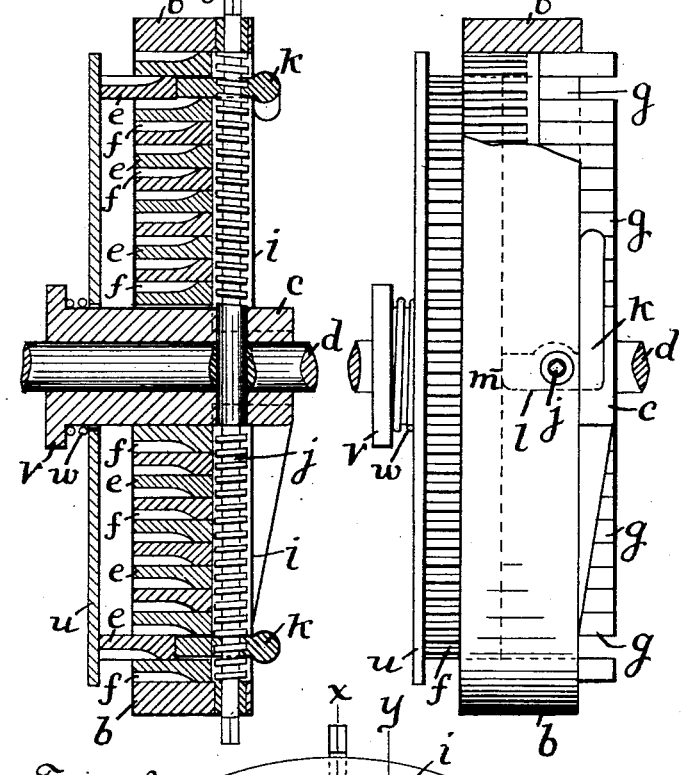
Figure 5:
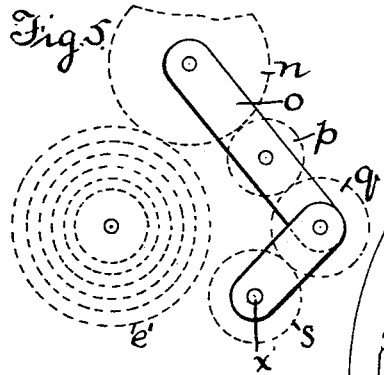
Figure 4:
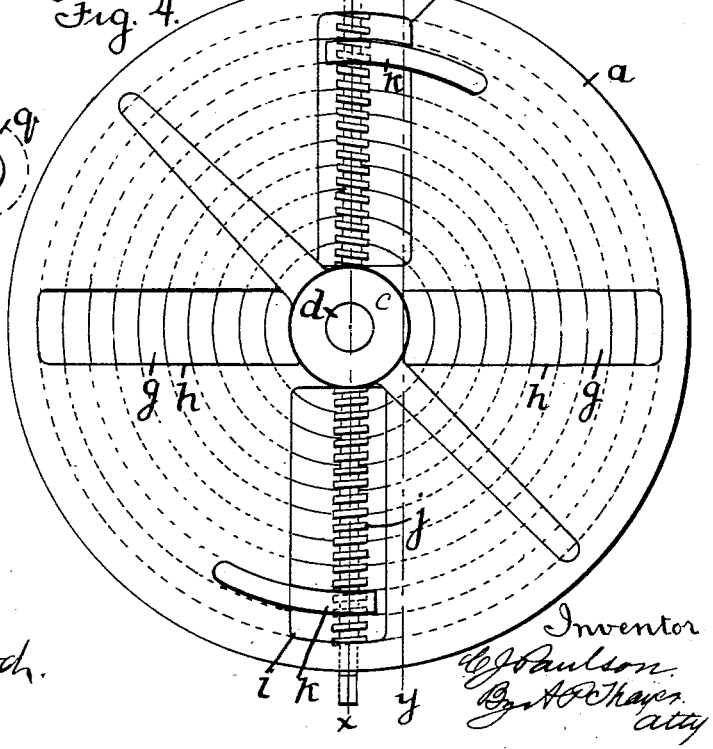

Figure 1 is a face view of my improved differential gear-wheel with a part broken out. Fig. 2 is a sectional elevation of the said wheel on line $x$ $x$, Fig. 4. Fig. 3 is a detail showing some of the parts in section on line $y$ $y$, Fig. 4. Fig. 4 is a side view of said wheel. Fig. 5 is a diagram indicating means of gearing my improved differential wheel with a driver.

I provide a disk $a$, having the radial slots $h$ $h$ and $i$ and provided with a peripheral flange $b$, and a central hub $c$, the hub being bored for a shaft as $d$, which may be considered the feed screw of a turning lathe. Between the hub $c$, and flange $b$, I fit a number of rings $e$, one within another and of equal width as the width of flange $b$, said rings being capable of sliding laterally about half their width, more or less, to be exposed to that extent beyond the said flange, and each having spur gear teeth $f$ cut on the part of the outer face that is so exposed when the ring is shifted from the normal position. Each ring has one and preferably two studs $g$ on the edge facing the disk projecting through radial slots $h$ in the disk, to serve as drivers for impelling the disk.

In the other radial slots $i$ of the disk and through the hub and the flange thereof a right and left hand threaded screw $j$ is fitted, on which are two ring shifting cams $k$, one each side of the hub of the disk, so adjusted that they may be shifted along the rings from one to another when said cams are so set on the screw that the side $l$, (dotted in Fig. 1) faces the rings and both will connect alike with one and the same ring but at diametrically opposite points.

When the cams are set to any one ring and then turned so that the ends $m$ (also dotted in Fig. 1) bear against the ring, said ring will be projected from the rest as seen in Figs. 1 and 2, so that its toothed portion $f$, will be brought into position for gearing with a spur driver as indicated by the dotted line $n$, Fig. 5, carried on a swing frame $o$, adapted to permit said driver to be shifted suitably to engage with any one of said rings, said driver being at the extremity of a train of gear wheels as $p$—$q$—$s$, the latter being on a shaft as $x'$ to be located in fixed bearings as the live spindle of a turning lathe. The dotted lines $e'$ Fig. 5, indicate the toothed rings of the wheel.

On the side of the wheel to which the rings are shifted for gearing with the driver, is a disk follower $u$ adapted to slide on the hub with a coiled spring $w$, between it and the collar $v$ to return the rings to normal position when released by the cams so that the rings not to be used will not interfere with the one to be used. In this example I represent eleven rings comprised in one wheel whereby as many changes may be had which it will be found is a simpler method of making the changes required in a screw cutting lathe, than by the change wheels of ordinary use. It is to be understood that the rings are gaged in size and number of teeth, and suitably numbered according to the required effects, so that a ring of any given number will produce the known corresponding result as a certain pitch of a screw.

I do not limit myself to the cams for shifting the rings, for it is manifest that various other devices may be employed for that purpose, nor do I limit myself to the screw for shifting the cams, for various other means may also be substituted for that.

It will be seen that by the arrangement of the rings one upon another within the flange and only bearing against the side of the disk instead of being made to work through annular slots of the disk, the number of toothed rings that can be used is much greater, affording a correspondingly greater number of changes and the construction is much cheaper.

I claim—

1. The improved differential gear wheel consisting of the radially slotted disk having the peripheral laterally projecting flange, a series of spur toothed concentric laterally shifting rings confined one upon another within the flange and against the side of the disk, and means to shift any one of the rings so as to project beyond the flange to set the teeth in position for use, said rings having driving studs engaging radial slots of the disk substantially as described.

2. The improved differential gear wheel consisting of the radially slotted disk having the peripheral laterally projecting flange, a series of spur toothed concentric laterally shifting rings confined one upon another within the flange and against the side of the disk, means to shift any one of the rings so as to project beyond the flange to set the teeth in position for use, said rings having studs engaging radial slots of the disks, and means to return said rings to the normal position substantially as described.

3. The combination in a differential gear wheel, of the ring carrying disk, the series of concentric spur toothed rings adapted to be shifted laterally independently of each other, the ring shifting cams and the cam shifting screw substantially as described.

4. The combination in a differential gear wheel, of the ring carrying disk, the series of concentric spur toothed rings adapted to be shifted laterally independently of each other, the ring shifting cams, cam shifting screw and the ring shifting follower substantially as described.

5. The combination in a differential gear wheel, of the ring carrying disk having the peripheral flange, the series of concentric spur toothed rings adapted to be shifted laterally independently of each other, the ring shifting cams, means for shifting the cams, the spring, and the follower for returning the rings substantially as described.

Signed at New York city, in the county and State of New York, this 10th day of April, A. D. 1894.

CARL JOHAN PAULSON.

Witnesses:
V. NELSON,
W. J. MORGAN.